(12) United States Patent
Huang et al.

(10) Patent No.: US 8,078,389 B2
(45) Date of Patent: Dec. 13, 2011

(54) METHOD AND APPARATUS FOR DETERMINING A NORMAL COMBUSTION CHARACTERISTIC FOR AN INTERNAL COMBUSTION ENGINE FROM AN ACCELEROMETER SIGNAL

(75) Inventors: Jian Huang, Richmond (CA); Richard Ancimer, Columbus, OH (US); Duran Cheung, Vancouver (CA)

(73) Assignee: Westport Power Inc., Vancouver, BC (CA)

( * ) Notice: Subject to any disclaimer, the term of this patent is extended or adjusted under 35 U.S.C. 154(b) by 0 days.

(21) Appl. No.: 12/788,273

(22) Filed: May 26, 2010

(65) Prior Publication Data

US 2010/0286893 A1 Nov. 11, 2010

Related U.S. Application Data

(63) Continuation of application No. PCT/CA2008/002043, filed on Nov. 20, 2008.

(30) Foreign Application Priority Data

Nov. 27, 2007 (CA) .................................... 2609718

(51) Int. Cl.
*F02P 5/00* (2006.01)
(52) U.S. Cl. ............... 701/114; 123/406.23; 123/406.24
(58) Field of Classification Search .................. 701/103; 123/479, 480, 435, 501, 502, 406.23, 406.24, 123/406.29; 73/35.09, 35.12, 35.01
See application file for complete search history.

(56) References Cited

U.S. PATENT DOCUMENTS

| | | | |
|---|---|---|---|
| 5,387,253 A | 2/1995 | Remboski, Jr. et al. | |
| 6,247,448 B1* | 6/2001 | Scholl et al. | 123/406.33 |
| 6,273,064 B1 | 8/2001 | Scholl et al. | |
| 6,275,765 B1* | 8/2001 | Divljakovic et al. | 701/102 |
| 6,289,735 B1* | 9/2001 | Dister et al. | 73/579 |
| 6,912,992 B2* | 7/2005 | Ancimer et al. | 123/299 |
| 7,073,485 B2 | 7/2006 | Truscott et al. | |
| 7,133,761 B2 | 11/2006 | Ancimer | |
| 7,200,487 B2* | 4/2007 | Ancimer | 701/111 |
| 7,594,493 B2* | 9/2009 | Matekunas et al. | 123/299 |
| 2004/0118557 A1* | 6/2004 | Ancimer et al. | 166/227 |
| 2004/0162668 A1 | 8/2004 | Rawlinson et al. | |
| 2008/0035108 A1 | 2/2008 | Ancimer et al. | |
| 2008/0228341 A1 | 9/2008 | Orifij | |

FOREIGN PATENT DOCUMENTS

EP 0709664 A1 5/1996

* cited by examiner

*Primary Examiner* — John Kwon
(74) *Attorney, Agent, or Firm* — McAndrews, Held & Malloy, Ltd.

(57) ABSTRACT

The method comprises operating a calibration engine, and collecting combustion characteristic data and reference accelerometer signals, which are correlated with each other and stored in a calibration table. The calibration table can be used by an engine to determine a real-time normal combustion characteristic when the engine is operating by collecting a real-time accelerometer sensor signal and cross correlating with the correlated data stored in the calibration table. Accordingly, the apparatus comprises a calibration engine comprising a calibration sensor, a reference accelerometer sensor and a data storage device for storing the collected calibration data that is correlated with the collected reference accelerometer signals, and an engine equipped with an accelerometer sensor, a calibration table and an electronic engine controller programmed to receive real-time accelerometer signals and cross correlate them with reference accelerometer signals to determine a real-time normal combustion characteristic.

17 Claims, 17 Drawing Sheets

METHOD AND APPARATUS FOR DETERMINING A NORMAL COMBUSTION CHARACTERISTIC FOR AN INTERNAL COMBUSTION ENGINE FROM AN ACCELEROMETER SIGNAL

CROSS-REFERENCE TO RELATED APPLICATION(S)

This application is a continuation of International Application No. PCT/CA2008/002043, having an international filing date of Nov. 20, 2008, entitled "Method And Apparatus For Determining A Normal Combustion Characteristic For An Internal Combustion Engine From An Accelerometer Signal". The '043 international application claimed priority benefits, in turn, from Canadian Patent Application No. 2,609,718 filed Nov. 27, 2007. The '043 international application is hereby incorporated by reference herein in its entirety.

STATEMENT OF GOVERNMENT INTEREST

This invention was made with Government support under DE-FC26-06NT42967 awarded by DOE. The Government has certain rights in this invention.

FIELD OF THE INVENTION

The present invention relates to a method and apparatus for determining a normal combustion characteristic for an internal combustion engine from an accelerometer signal. The accelerometer is deflected by changes in the engine's in-cylinder pressure and the disclosed method processes the generated data to assist in controlling the operation of the engine to improve combustion quality, combustion efficiency, engine performance or other desired engine operational objectives.

BACKGROUND OF THE INVENTION

In operating an internal combustion engine, combustion data relating to normal combustion characteristics such as the timing for start of combustion ("SOC") and heat release rate, can be used to improve the combustion quality, engine efficiency and reduce engine out emissions of pollutants. Accordingly, more accurate combustion data relating to at least one of these characteristics is desirable to improve engine operation. Instrumentation for measuring combustion data, such as pressure transducers that employ sensors disposed in the combustion chamber, or emissions sensors that can be located in the exhaust port, or temperature sensors located in the combustion chamber or in the exhaust port can collect data that can be used to indicate combustion characteristics, but it can be impractical to employ such sensors in a mass produced engine, because in addition to being intrusive and/or being subjected to a harsh environment in the location where they are installed, such sensors can also be expensive and lack the durability needed for reliable and prolonged everyday use.

Accelerometer sensors are sold commercially for use as knock sensors for detecting engine knock. Engine knock is considered an abnormal combustion characteristic because it does not occur when the engine is operating normally. Engine knock correlates to violent combustion events that can be caused by premature and uncontrolled detonation of the charge inside the combustion chamber, caused, for example, if an Otto-Cycle engine has been fuelled with a fuel with too low an octane rating, or if spark timing is too advanced, or if deposits in a combustion chamber create hot spots that cause early ignition. In a Diesel-Cycle engine, engine knock can be caused, for example, if fuel injection timing is too early. Engine knock can cause a decrease in engine performance and in severe cases, if not corrected, engine knock can cause serious damage to the engine, including destruction of the pistons, connecting rods, exhaust valves, head gasket and spark plugs or glow plugs. Accelerometers that are employed as "knock sensors" are typically located on an engine's cylinder block and sometimes on the cylinder head. As an abnormal combustion characteristic, engine knock is not a combustion characteristic that is measured in each combustion cycle. Most knock sensors send a base or "no knocking" reference signal to the electronic engine controller and an easily detectable higher signal when engine knock is detected. Because there is a relatively large difference between the reference signal and the signal when engine knock is detected the accuracy of the knock sensor is relatively unimportant. In this respect, knock sensors are only required to make crude measurements since they are configured to detect only engine knock.

An accelerometer sensor that produces a signal that can be used to determine a normal combustion characteristic in a combustion cycle is mounted to a component of the engine, and therefore contains more information than just the information that pertains to a specific combustion characteristic. That is, an accelerometer sensor mounted to an engine can detect deflections caused by many sources other than the monitored combustion characteristic and without processing the raw signal from an accelerometer sensor to filter out signal noise, the raw signal can not be used as a sufficiently accurate indicator of a combustion characteristic. Information indicating a combustion characteristic needs to be accurate for it to be used to better control or diagnose combustion in an internal combustion engine to improve engine performance and efficiency, and/or engine-out emissions. The operation of most types of internal combustion engines can be improved if an engine controller is provided with accurate information about at least one combustion characteristic, such as, for example, information about combustion phasing, which includes the timing for the start of combustion ("SOC"), the combustion rate, which includes the heat release rate as one indication of the combustion rate, the peak heat release rate, the in-cylinder pressure, and engine misfiring. With an accurate determination of a combustion characteristic, engine performance can be improved by adjusting parameters such as, for example, the timing for fuel injection, the fuel injection rate, and the quantity of fuel injected. Furthermore, while this type of information regarding a determined combustion characteristic can be useful for improving the operation of most internal combustion engines, it is particularly useful for a type of engine known as a homogeneous-charge compression-ignition ("HCCI") engine. Although HCCI engines have not yet been widely commercialized, in recent years significant work has been directed to developing such engines because they offer the potential for higher efficiency and lower engine-out emissions compared to conventional compression ignition Diesel-Cycle engines and spark-ignited Otto-Cycle gasoline engines. For example, at highway cruising conditions the Diesel-Cycle engines in Class 8 heavy-duty trucks operate at about 40% brake thermal efficiency, and these heavy trucks typically achieve only about 6 miles per gallon. HCCI engines could improve engine efficiency significantly, giving a gain in fuel economy. For vehicles that use gasoline-based engines, which are even less efficient than their diesel counterparts, the potential fuel savings is greater still. In addition, because of the potentially lower engine-out emissions from HCCI combustion, HCCI engines might allow future diesel-fuelled engines to avoid selective catalytic reduction and its complicated and expensive system of multiple catalysts.

One of the main challenges delaying the commercial introduction of HCCI engines is the difficulty in controlling HCCI combustion and a method of accurately determining a combustion characteristic such as the timing for SOC or the heat release rate can be used to solve this challenge. For example, a production-ready SOC sensing system could help to enable HCCI combustion over a wide range of conditions. To be successful, such a sensing system should meet the important practical needs of commercial automotive products, namely low cost, reliability and durability.

An accelerometer signal can be conditioned and digitized, for example as set out in co-owned U.S. Pat. Nos. 7,133,761 and 7,200,487, respectively entitled "Method and Apparatus for Controlling an Internal Combustion Engine Using Accelerometers", and, "System and Method for Processing an Accelerometer Signal to Assist in Combustion Quality Control in an Internal Combustion Engine".

Some of the challenges associated with methods for determining a combustion characteristic for an engine include engine-to-engine variability, cylinder-to-cylinder variability, and sensor-to-sensor variability. Accordingly, there is a need for a method of determining an engine combustion characteristic that is effective, accurate, and easy to calibrate, even if there can be variability from engine-to-engine, cylinder-to-cylinder and from sensor-to-sensor.

SUMMARY OF THE INVENTION

A method is disclosed for determining a combustion characteristic of an internal combustion engine from an accelerometer signal. The method comprises the steps of: (a) operating a calibration engine, equipped with a calibration sensor and a reference accelerometer sensor, at a predetermined operating condition and using the calibration sensor to detect the combustion characteristic and the reference accelerometer sensor to collect a reference accelerometer signal; (b) correlating the combustion characteristic with the reference accelerometer signal and storing correlated data in a calibration table where it is associated with the predetermined operating condition; and, (c) equipping an engine with an accelerometer sensor, the calibration table and an electronic engine controller, whereby when the engine is operated at the predetermined operating condition, the electronic engine controller can determine a real-time combustion characteristic by collecting a real-time accelerometer signal from the accelerometer sensor and cross correlating with the correlated data stored in the calibration table.

In a preferred method, the calibration sensor is a pressure transducer that measures in-cylinder pressure, and the combustion characteristic comprises at least one of heat release rate, peak heat release rate, and timing for start of combustion, which are derived from measured in-cylinder pressure.

The calibration table can comprise correlated data associated with a plurality of predetermined operating conditions each associated with a particular engine speed and load. For predefined engine operating modes, data for the calibration table can be collected from a matrix of operating points defined by engine speed and engine load. When producing the calibration table the preferred method further comprises: applying a fast Fourier transform to the reference accelerometer signal to yield a power spectrum for the reference accelerometer signal; performing a progressive scan to identify a characteristic frequency of the reference accelerometer signal when combustion occurs for the predetermined operating condition; applying to the reference accelerometer signal a band-pass filter with a central frequency equal to the characteristic frequency, to produce a filtered reference accelerometer signal; normalizing the filtered reference accelerometer signal before storing it in the calibration table; and programming the electronic engine controller to apply to the real-time accelerometer signal the band-pass filter with the central frequency equal to the characteristic frequency, to produce a filtered real-time accelerometer signal. The preferred method further comprises programming the electronic engine controller to cross correlate the filtered real-time accelerometer signal with the filtered reference accelerometer signal stored in the calibration table and to identify a phase shift at a maximum positive correlation. That is, the phase shift is identified as the amount of time that one of the signals is shifted to arrive at the maximum positive correlation.

In a preferred method the combustion characteristic that is determined from the accelerometer signal comprises the timing for start of combustion. In this case the method further comprises programming the electronic engine controller to determine the timing for start of combustion by determining a real-time value for start of combustion timing by applying the phase shift to a value for start of combustion timing that is stored in the calibration table as part of the correlated data.

The method can further comprise using a regression method to calculate a linear correlation between the reference accelerometer signal and the combustion characteristic for the predetermined operating condition.

The method already described can utilize a number of steps to filter the accelerometer signal, for example, based on the differences between the frequencies associated with the monitored combustion characteristic and the frequencies associated with "noise" which comes from other sources. The preferred method can be made even more robust by employing a secondary indicator of the combustion characteristic to decide if the determined combustion characteristic information should be relied upon or discarded. That is, the method can further comprise programming the electronic engine controller to reject a value determined for the real-time combustion characteristic and re-sampling to collect another real-time accelerometer signal when a secondary real-time indicator of the real-time combustion characteristic generates a value for the real-time combustion characteristic that is different from the value determined by the electronic engine controller using the calibration table by more than a predetermined threshold. By way of a specific example, when the combustion characteristic is start of combustion timing, the secondary real-time indicator of real-time start of combustion timing can be the timing when the amplitude of the filtered real-time accelerometer signal surpasses the predetermined threshold value associated with the predetermined operating condition. The predetermined threshold value can be, for example, a predetermined percentage of peak amplitude for the filtered reference accelerometer signal for the predetermined operating condition. Accordingly, in this example, the secondary real-time indicator of the timing for start of combustion uses a different method to determine the real-time timing for start of combustion and does not use the calibration table to make this determination, and a significant difference between the two values determined for the timing for start of combustion can indicate that there is noise in the collected real-time accelerometer signal that puts into question the accuracy of the determined timing for start of combustion.

In preferred methods the reference accelerometer signal and the real-time accelerometer signal are collected for only a predetermined portion of an engine cycle. For determining information about a combustion characteristic, only data collected during the period of time of the engine cycle when combustion can occur is relevant. In a four stroke engine, this means that data does not need to be collected during the exhaust stroke, the intake stroke, and the early part of the compression stroke.

For practicing the method, also disclosed is a control system for an internal combustion engine. The control system comprises an accelerometer sensor mounted to the internal combustion engine at a location where the accelerometer sensor can detect oscillations that correlate to a combustion characteristic; a calibration table in which is stored, in association with a predetermined operating condition, a reference accelerometer signal collected from a calibration engine and an associated combustion characteristic derived from data collected by a calibration sensor when operating the calibration engine; an electronic engine controller programmed to receive a real-time accelerometer signal from the accelerometer sensor and to cross correlate it with the reference accelerometer signal for the predetermined operating condition, to determine a real-time combustion characteristic from a combustion characteristic stored in the calibration table in association with the reference accelerometer signal; and a signal wire for transmitting the signal from the accelerometer to the electronic engine controller.

In a preferred embodiment, the controller is further programmed to compare the real-time combustion characteristic to a target combustion characteristic and to command a change to at least one engine operating parameter until the real-time combustion characteristic matches the target combustion characteristic.

In preferred embodiments, the combustion characteristic that the controller is programmed to determine is at least one of heat release rate, peak heat release rate, and timing for start of combustion.

For practicing the method, also disclosed in a calibration engine that comprises an engine block comprising at least one combustion chamber defined by a cylinder, a piston and a cylinder head, a calibration sensor associated with the engine for detecting a combustion characteristic; a reference accelerometer sensor mounted to the internal combustion engine at a location where the reference accelerometer sensor can detect oscillations that correlate to the combustion characteristic; a data storage device for storing data associated with a predetermined engine operating condition, the data comprising a reference accelerometer signal collected from the reference accelerometer sensor, and a value associated with the combustion characteristic collected from the calibration sensor, and wherein stored data can be exported to a calibration table that can be used by an engine of the same design and specification as the calibration engine, to determine the real-time combustion characteristic from a real-time accelerometer signal without requiring a calibration sensor; and wiring to respectively connect the accelerometer sensor and the calibration sensor to the data storage device.

In preferred embodiments of the calibration engine, the calibration sensor is a pressure transducer mounted in the cylinder head with a sensor probe in the combustion chamber. For a multi-cylinder engine, a pressure transducer is mounted in the cylinder head for each combustion chamber.

An advantage of the disclosed method is that the calibration steps used to generate a calibration table by operating a calibration engine, only need to be done once for each engine model. Once a calibration engine is used to generate a calibration table, engines of the same model as the calibration engine, which have the same design and specifications, can then use the disclosed method to accurately determine combustion characteristics during engine operation from an accelerometer signal, and this information can be used by an engine controller to guide changes to operational parameters to optimize engine performance, efficiency, and/or reduce levels of pollutants in engine exhaust gases.

DETAILED DESCRIPTION OF PREFERRED EMBODIMENT(S)

Figure 1:
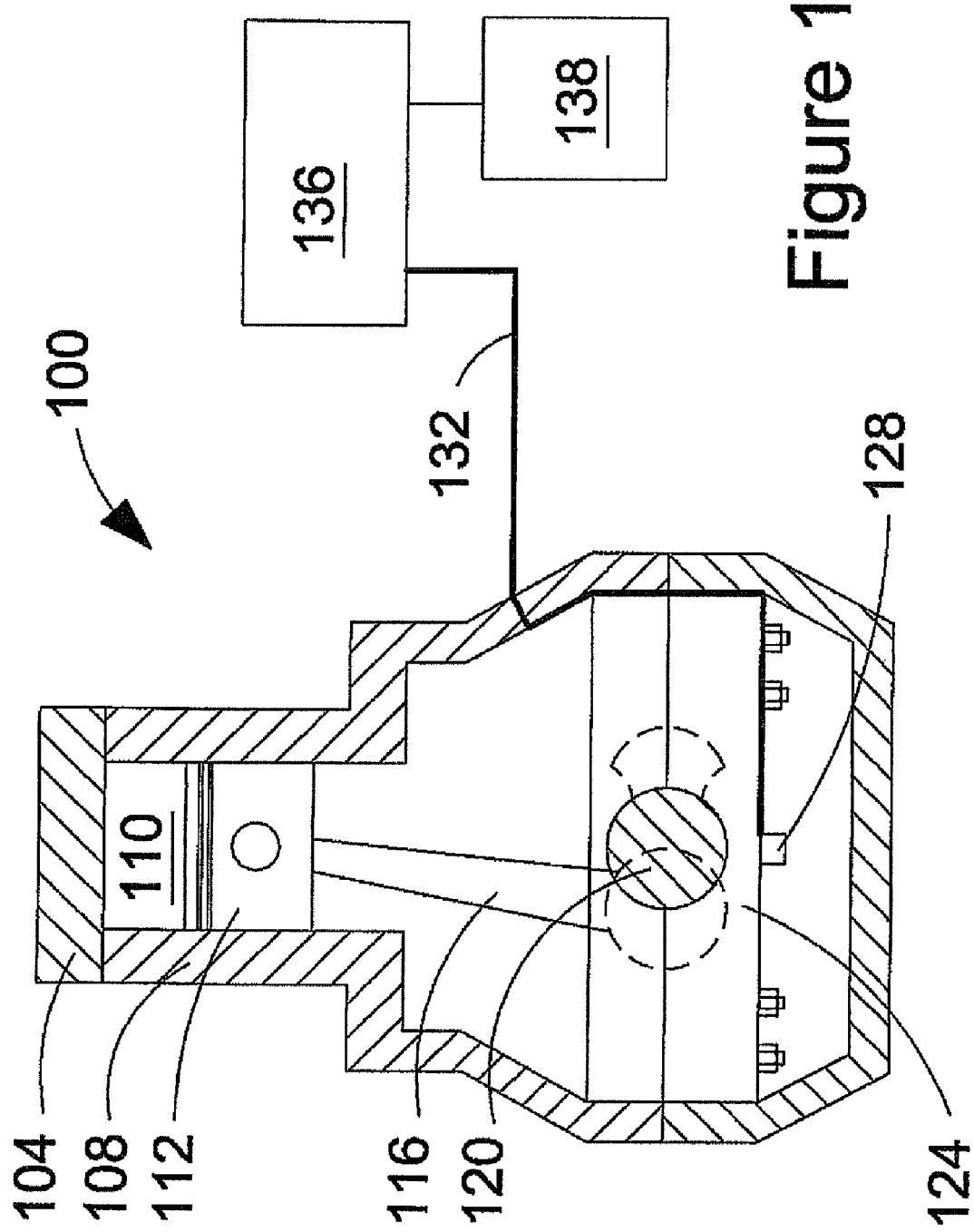
FIG. 1 is a schematic view of an engine with a control system that can be used to determine a combustion characteristic for the engine from an accelerometer signal.

FIG. 1, schematically illustrates an internal combustion engine with a control system that can be used to determine a combustion characteristic for an internal combustion engine from an accelerometer signal. Engine 100 includes combustion chamber 110, which in this example is defined by cylinder 108, cylinder head 104 and piston 112. For simplicity only one combustion chamber is shown although persons skilled in the technology will understand that the engine typically has two or more cylinders, and when there is a plurality of cylinders they can be arranged in banks. Piston 112 is reciprocable within cylinder 108, and the reciprocating motion of piston 112 is translated into rotation of crankshaft 120 via connecting rod 116 which is operatively attached at opposite ends to piston 112 and crankshaft 120. Intake and exhaust valves (not shown) are operative to deliver charge comprising oxygen from an intake manifold to combustion chamber 110, and to remove exhaust by-products therefrom to an exhaust manifold. Engine 100 further comprises fuel and air delivery systems, and other standard systems associated with internal combustion engines.

Engine 100 includes accelerometer sensor 128, shown mounted, for example, on main bearing cap 124. Bearing cap 124 acts as a damped oscillator by deflecting responsive to sudden changes in the in-cylinder pressure. The characteristic frequency of this oscillation is a physical property of the bearing cap assembly and is nearly independent of engine operating conditions. It is also repeatable among engines of the same design and specification. By identifying and isolating this characteristic frequency, combustion information can be extracted from the accelerometer signal and analyzed. The engine bearing caps have been found to be suitable as locations for generating an accelerometer signal with a suitable signal-to-noise ratio, but accelerometer sensor 128 can be mounted at other locations where there is also a suitable signal-to-noise ratio. In the context of this disclosure, when discussing "signal- to-noise ratio", the "signal" is the part of the accelerometer signal that is associated with deflections attributable to the monitored combustion characteristic in combustion chamber 110, and "noise" is the part of the accelerometer signal that is contributed from other sources not directly attributable to the monitored combustion characteristic, such as deflections caused by engine vibrations, road noise (for vehicles) or by electrical interference that distorts the electrical accelerometer signal. A preferred method of mounting accelerometer sensor 128 is taught by co-owned U.S. patent application Ser. No. 11/695,474 filed Apr. 2, 2007 (Publication No. US 2008/0035108), entitled "Method of Mounting an Accelerometer on an Internal Combustion Engine and Increasing Signal-To-Noise Ratio". Accelerometer sensor 128 transmits an electrical signal to electronic engine controller 136 through signal wire 132. Electronic engine controller 136 is programmed to receive real-time accelerometer signals from accelerometer sensor 128 and to cross correlate it with a reference accelerometer signal stored in calibration table 138. The reference accelerometer signal is associated with an engine operating condition that is the same as the engine operating condition when the real-time accelerometer sensor was collected. The reference accelerometer signal is also associated with a combustion characteristic that was derived from measurements collected from a calibration sensor installed on a calibration engine that matches the same model and specifications as engine 100. The calibration engine is described in more detail below, with reference to FIG. 2. In preferred embodiments, the reference accelerometer signal and the combustion characteristic derived from the data collected from the calibration sensor are stored in calibration table 138 and can be retrieved based on engine operating conditions, which in preferred embodiments include at least engine speed and engine load. Electronic engine controller 136 is programmed to determine a real-time engine combustion characteristic from a real-time accelerometer signal by correlating the real-time data with the data in the calibration table, and this method is described in more detail below, when FIG. 3 is described.

Figure 2:
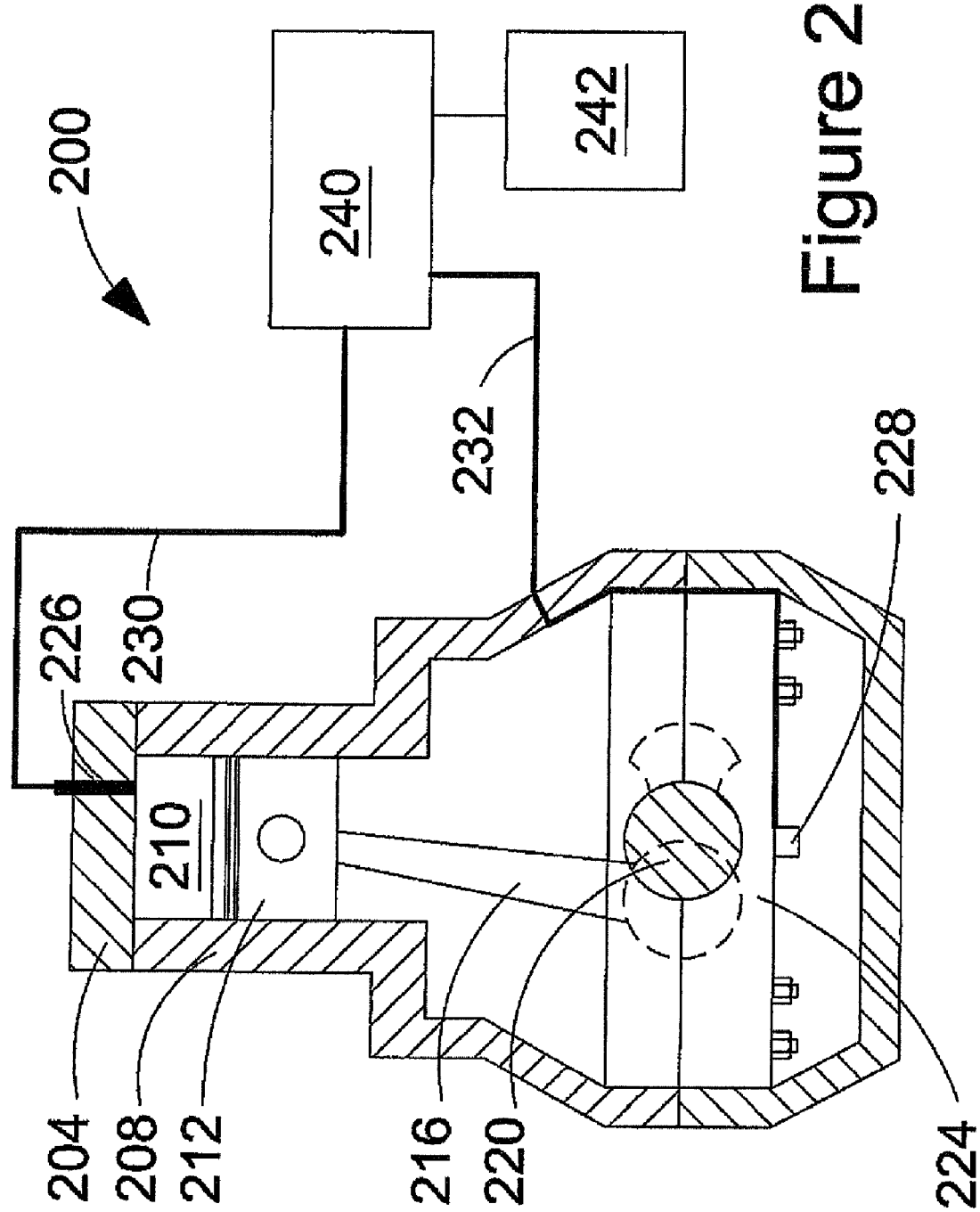
FIG. 2 is a schematic view of a calibration engine that can be used to collect data to generate a calibration table that correlates a combustion characteristic with a reference accelerometer signal.

FIG. 2 is a schematic view of a calibration engine, indicated by reference number 200. Calibration engine 200 has the same design and specification as engine 100 shown in FIG. 1. That is, cylinder 208, cylinder head 204, piston 212, which define combustion chamber 210 are the same as the components shown in FIG. 1 that show respective cylinder 108, cylinder head 104, piston 112, which define combustion chamber 110. Similarly, connecting rod 216, crankshaft 220 and bearing cap 224 are the same as connecting rod 116, crankshaft 120 and bearing cap 124 shown in FIG. 1. However, calibration engine 200 further comprises calibration sensor 226, which in the illustrated embodiment is a pressure transducer with a sensor probe mounted in cylinder head 204 and extending into combustion chamber 210. That is, in this illustrated example, the detected combustion characteristic is in-cylinder pressure, which is measured by calibration sensor 226. In-cylinder pressure data is sent through signal wire 230 from calibration sensor 226 to computer 240, which preferably processes the raw calibration data before it is saved in data storage device 242. The raw reference accelerometer signal collected from reference accelerometer sensor 228 is sent through signal wire 232 to computer 240, which preferably processes the raw reference. accelerometer signal before it is saved in data storage device 242, In preferred embodiments, the raw sensor signals are processed to filter out signal noise to improve the correlation between the signals and the measured combustion characteristic. The processed calibration data and the processed reference accelerometer data are correlated with each other in data storage device 242, and the stored data can be exported to a calibration table, such as calibration table 138 in FIG. 1. Preferably, reference accelerometer sensor 228 is mounted to main bearing cap 224 of calibration engine 200 in the same, location that accelerometer sensor 128 is mounted to main bearing cap 124 of engine 100.

Figure 3:
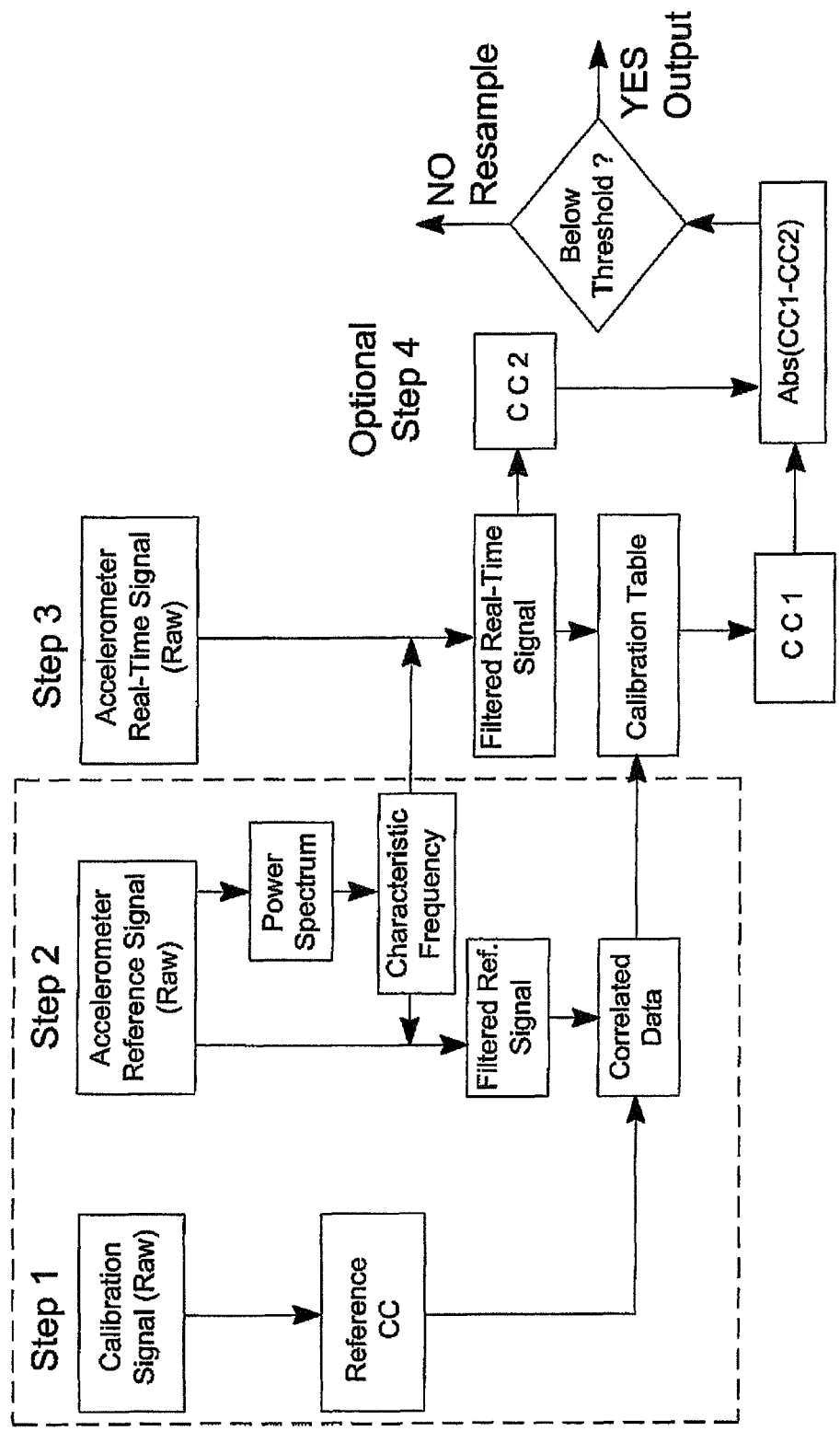
FIG. 3 is a flow diagram that depicts a preferred embodiment of the method.

The disclosed method illustrated in FIG. 3 comprises three steps to determine a combustion characteristic (CC1) from a real-time accelerometer signal, and an optional fourth step that can be employed to improve the robustness of the method. An advantage of this method is that the first two steps, shown inside the dashed-line box are calibration steps and they need only be done once for each engine of a particular design and specification. The calibration steps are carried out using a calibration engine and a matrix of engine speeds and operating modes which cover the full engine operating range. In step one, at each mode, ignition timing is predetermined by known methods, to yield desired engine qualities, which can include, for example, combustion stability, combustion efficiency, and levels of pollutants in the engine exhaust below prescribed limits. By way of example, the disclosed method can be employed to determine a reference combustion characteristic ("Reference CC" in FIG. 3) such as the timing for start of combustion. In this example, as shown in FIG. 3, Reference CC can be derived from Calibration Signal (Raw), which is the data collected from calibration sensor 226, shown in FIG. 2. Specifically, a computer, such as computer 240 in FIG. 2, is programmed to calculate the engine heat release rate from the in-cylinder pressure measured by calibration sensor 226, and then Reference CC, which is the reference timing for start of combustion CC is determined from the heat release rate.

In step two, at each engine, operating mode, Accelerometer Reference Signal data is collected. Preferably, the accelerometer data is collected at the same time that the data is collected from the calibration sensor. A fast Fourier transform ("FFT") of the Accelerometer Reference Signal (Raw) data provides the Power Spectrum of the accelerometer signal. A progressive scan is then performed to identify the Characteristic Frequency of the accelerometer signal when combustion occurs. Then the raw Accelerometer Reference Signal is band-pass filtered with a central frequency equal to the Characteristic Frequency. The band-pass filter effectively removes the noise at other frequencies and focuses on the frequencies of interest to combustion. Accordingly, the raw Accelerometer Signal is processed to produce a Filtered Reference Signal, which is then normalized and stored in a calibration table whose entries are the engine speed and load. A linear correlation between the Filtered Reference Signal and the Reference CC, (reference timing for start of combustion in this example), is calculated using a regression method for each mode and stored in the calibration table as the Correlated Data shown in FIG. 3.

To complete the Calibration Table, a Calibration Signal (Raw) and an Accelerometer Reference Signal (Raw) is collected at each engine operating mode, and step one and step two are followed for each operating mode where data is collected.

In step three, an engine is operated and a real-time accelerometer signal is collected and band pass filtered using the same band pass filter that was applied to the reference accelerometer signal, using the same Characteristic Frequency. A Filtered Reference Signal is picked from the Calibration Table based on the engine speed and load. A computer computes the cross correlation of the two filtered signals. The phase shift of the two filtered signals is identified as the shift corresponding to the maximum positive correlation. The phase shift is applied to the stored timing for start of combustion (Reference CC) collected in step one to obtain the real-time timing for start of combustion (CC1). The cross-correlation method is resistant to local noise. Also, high-frequency signals can be more readily detected by commercial accelerometer sensors compared with low frequency signals.

Step four can be employed to improve the robustness of the method. In step four, another method is used to estimate the combustion characteristic and the estimate determined in step four is identified in FIG. 3 as CC2. If CC2 is reasonably close to CC1, which was determined in step three (CC1) then CC1 is accepted and output as the value for the combustion characteristic. If CC1 is different from CC2 by more than a predetermined threshold, then CC1 is rejected and the real-time accelerometer signal is re-sampled and step 3 is repeated. In the example described herein, where the determined combustion characteristic is the timing for start of combustion, a predetermined percentage of the peak amplitude of the real-time accelerometer signal can be chosen as an indication from which can be obtained an independent estimate of the timing for start of combustion. That is, the timing for when the real-time accelerometer signal exceeds this predetermined percentage can be used as an independent estimate of the timing for start of combustion. This independently derived estimate for the tinning for start of combustion (CC2) can be compared to the timing for start of combustion determined by step 3 (CC1), by calculating the absolute value of the difference between CC1 and CC2. If the difference is within a preset tolerance, the result is accepted; otherwise, the result is rejected and a re-sampling is performed. When the difference is outside of the preset tolerance this can caused by noise in the sampled real-time accelerometer signal. Accordingly, step four helps to filter out real-time accelerometer signals that might include noise that could not be filtered from the signal, which might produce inaccurate results.

Experimental data has been collected from tests conducted using two Cummins™ model ISB engines, which served as calibration engines. Prior to engine testing, all seven bearing caps on each engine were removed and machined for mounting accelerometer sensors. Each engine was fully commissioned and baseline tests were conducted at the rated power and torque. A Kistler™ model 6607C1 water-cooled pressure transducer was installed in each cylinder, and used to measure the in-cylinder pressure. A Cummins™ high speed data acquisition system was used to collect the pressure and accelerometer sensor data generated during the engine testing.

Data from the accelerometer sensor and in-cylinder pressure sensor from each of the two engines were collected at 6 modes selected from 13 modes defined by the European Stationary Cycle ("ESC"). For each mode, tests were conducted at nominal, advanced and retarded injection timing. The test conditions are summarized in Table 1. Motoring data was also collected for each mode at the nominal timing by intermittently cutting off the injection of fuel for a selected cylinder. A repeatability study was also conducted on one of the engines to examine whether remounting the accelerometer sensor had any effect on the accelerometer sensor signal. All testing points were also repeated for the second engine without remounting.

TABLE 1

| Engine Test Modes | | | | |
|---|---|---|---|---|
| ESC Mode | % Load | Torque (lb-ft) | RPM | Power (BHP) |
| 5 | 50 | 305 | 1885 | 109 |
| 6 | 75 | 457.5 | 1885 | 164 |
| 8 | 100 | 610 | 2292 | 266 |
| 9 | 25 | 152.5 | 2292 | 67 |
| 12 | 75 | 457.5 | 2698 | 235 |
| 13 | 50 | 305 | 2698 | 157 |

Figure 4:
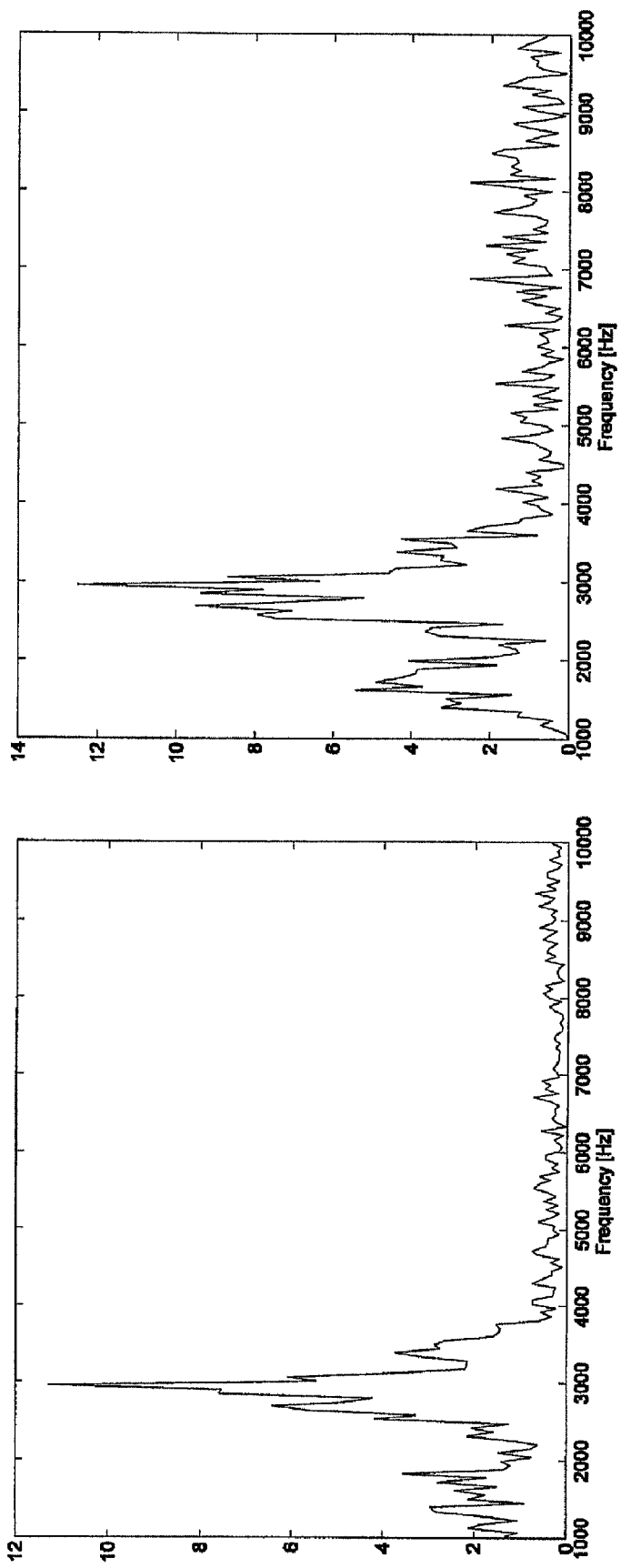
FIG. 4 shows two plots to accelerometer signals comparing the signal produced by a research-grade accelerometer with the signal produced by a commercially sold accelerometer sensor intended for use as a knock sensor.

Data was also collected at all modes with a Ditran™ model 302382 tri-axial research-grade accelerometer mounted on selected bearing caps. To improve the understanding of accelerometer sensor performance, the data collected from these research-grade accelerometers was compared with the data collected from the less expensive accelerometer sensors which are produced in relatively large volumes and which are designed to be employed as knock sensors. FIG. 4 shows the power spectrum of accelerometer signals from accelerometer sensors mounted to a main bearing cap next to the third cylinder of one of the test engines at mode 9. The plot on the left hand side is of data collected from the knock sensor, and the plot on the right hand side is of data collected from the research grade accelerometer. The similarity between these plots shows that a knock sensor is capable of producing a signal that can be used to collect data suitable for determining a combustion characteristic beyond simply the detection of engine knock, which is a severe condition that is relatively easy to detect.

Figure 5:
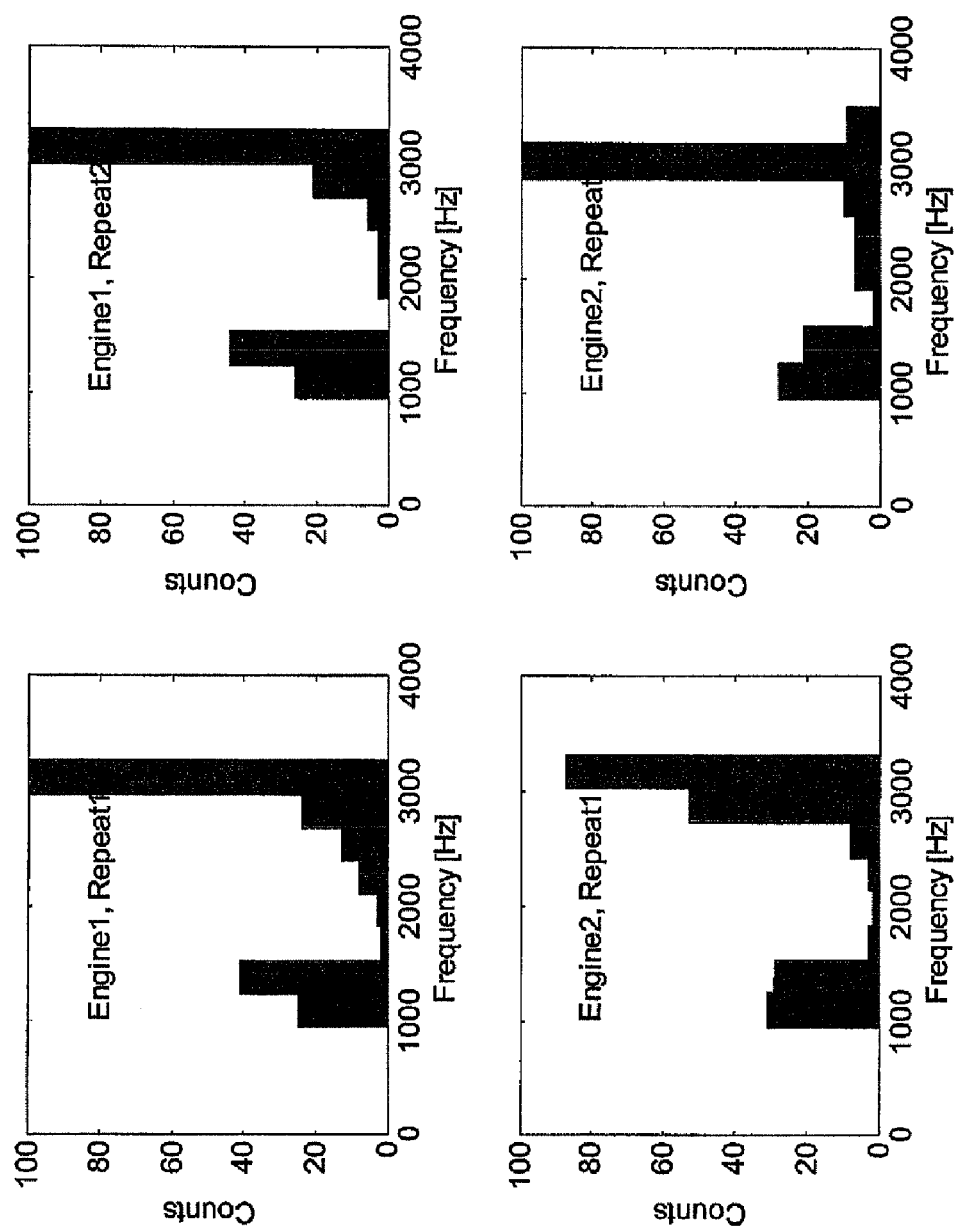
FIG. 5 shows plots of data that compare the characteristic frequency between different engines and repeated tests that show that a characteristic frequency can be identified for an engine operating point that is consistent for different engines with the same design and specifications.

In conducting the experiments on the two Cummins™ engines, all firing data was averaged over 80 engine cycles to reduce the noise level. All motored data was averaged over 20 to 30 test cycles. The accelerometer sensor data showed high frequency oscillations with significant magnitude at the start of combustion. An FFT analysis revealed that for these engines this oscillation has a dominant frequency band centered around 3000 Hz, which, for this engine, was nearly independent of engine speed and load. By way of example, the data plotted in FIG. 4 shows the power spectrum of the accelerometer sensor signal above 1000 Hz when one of the engines was operated at ESC mode 9. The frequency corresponding to the peak in the power spectrum is the principle frequency for the oscillation when combustion starts. FIG. 5 shows histograms of the peak frequency distribution under all test modes and for the two engines used in the experiments. These histograms show that the principle frequency is identical between the two engines tested.

A set of data was acquired at a number of engine operating modes to determine how well the accelerometer-based system could be used to determine the timing for start of combustion. This data included start of combustion timing swings at advanced, nominal, and slow combustion rates to test the detection of start of combustion at the widest expected range of heat release rates. Typical results are shown for some of the tested engine modes in FIGS. 6 through 9 which show the correlation between the timing for start of combustion determined from the accelerometer signal using the disclosed method, and the timing for start of combustion determined from the data collected by the in-cylinder pressure sensor.

Figure 6:
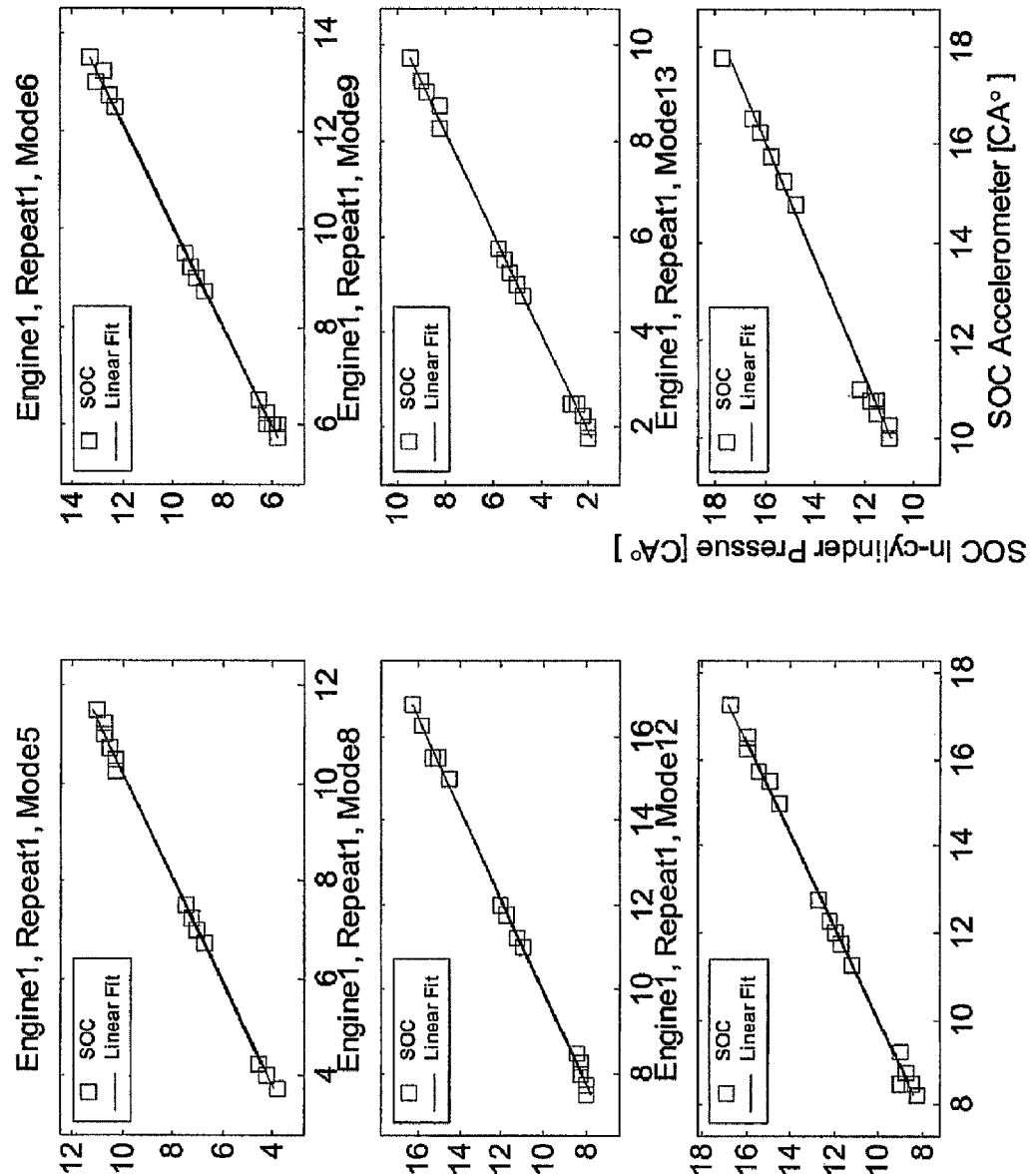
FIGS. 6 through 9 are data plots which show the correlation between the timing for start of combustion that is determined from an accelerometer signal using the disclosed method and the timing for start of combustion determined from measurements of in-cylinder pressure.
Figure 7:
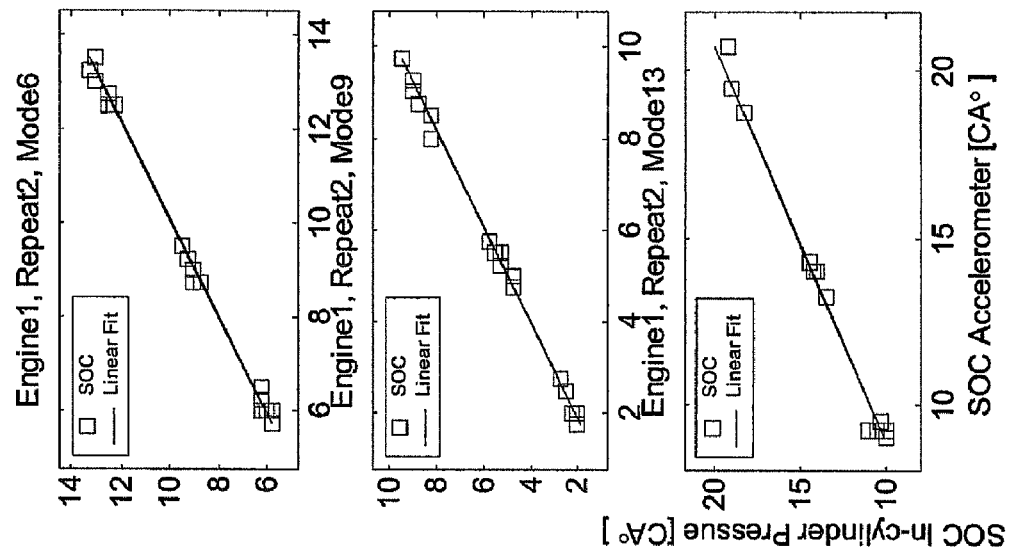
Figure 7:
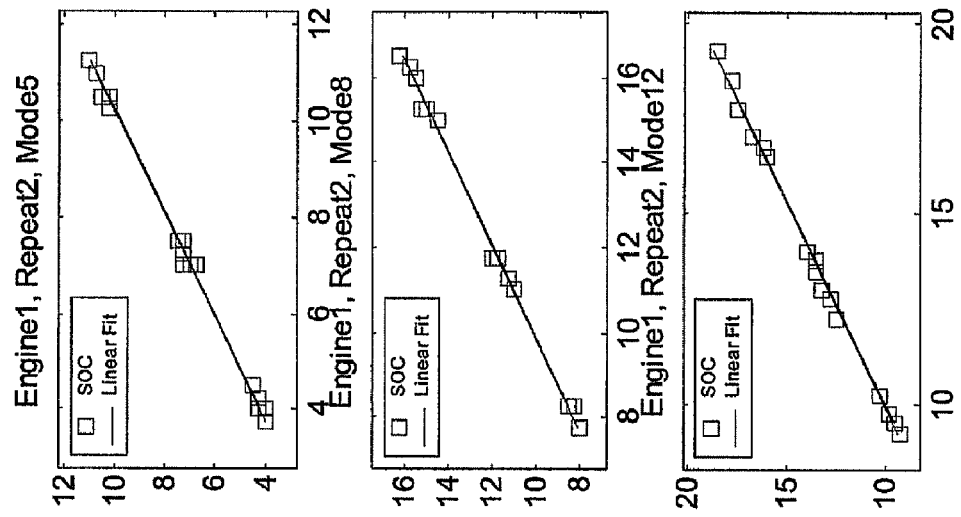
Figure 8:
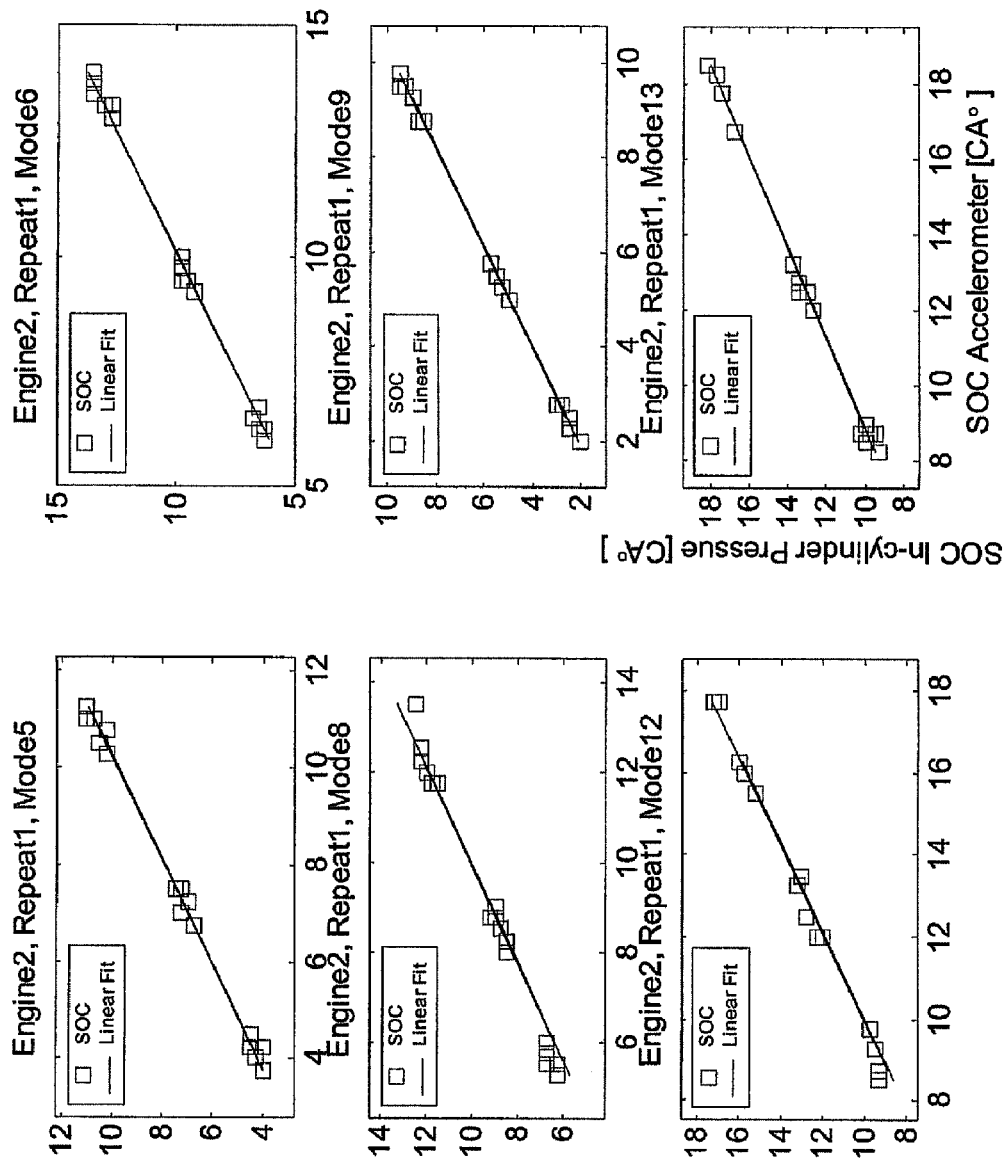
Figure 9:
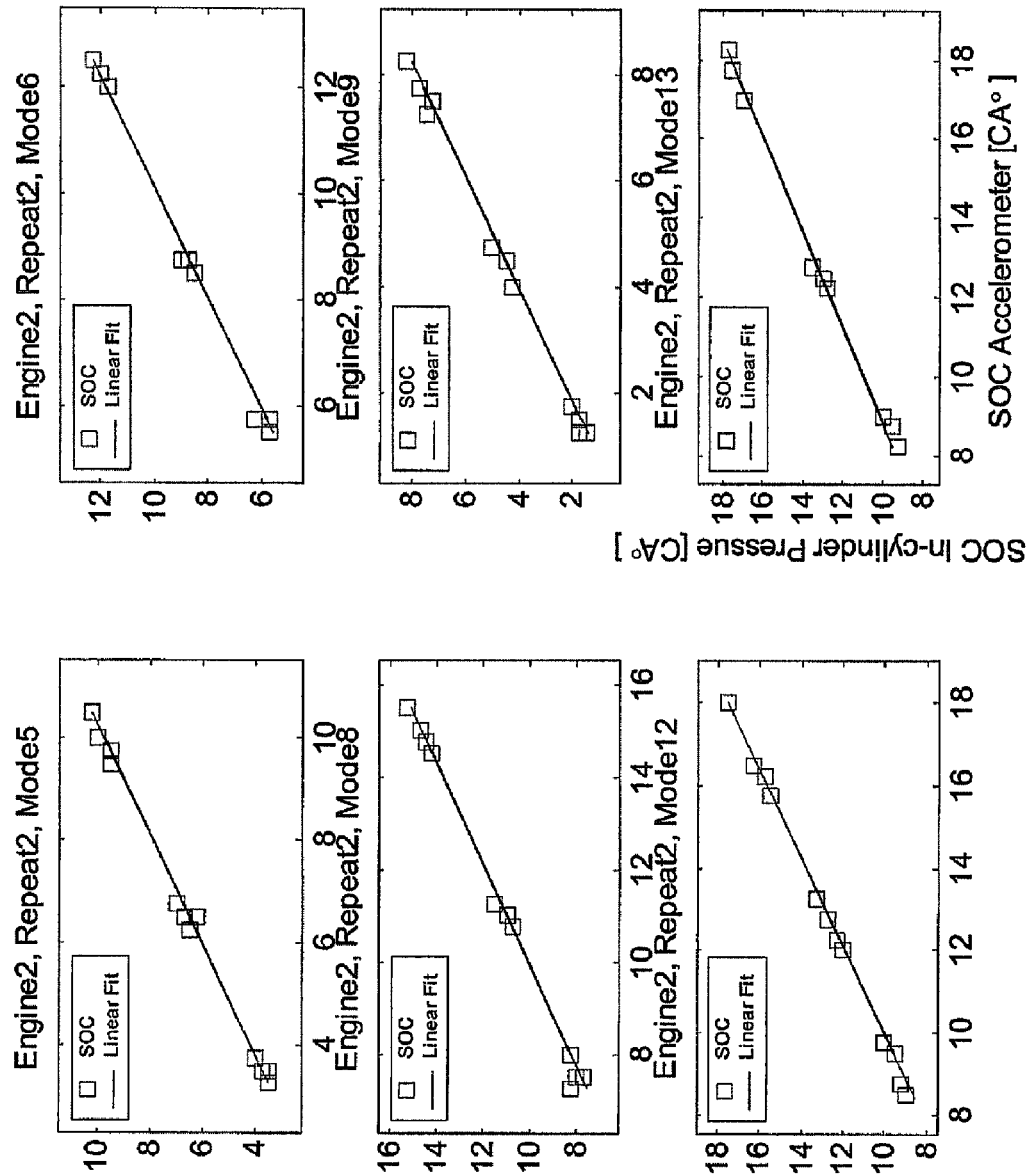

FIG. 6 shows data collected from the first engine ("engine1") from a first series of tests ("repeat1"), and FIG. 7 shows data collected from the same engine ("engine1) from a second series of tests ("repeat2"), collected after the sensors were remounted. Global correlations at each mode measured from engine1 were applied to the second engine ("engine2") and FIG. 8 shows data collected from engine2 from a first series of tests ("repeat1") and FIG. 9 shows data collected from engine2 from a second series of tests ("repeat2").

Figure 10:
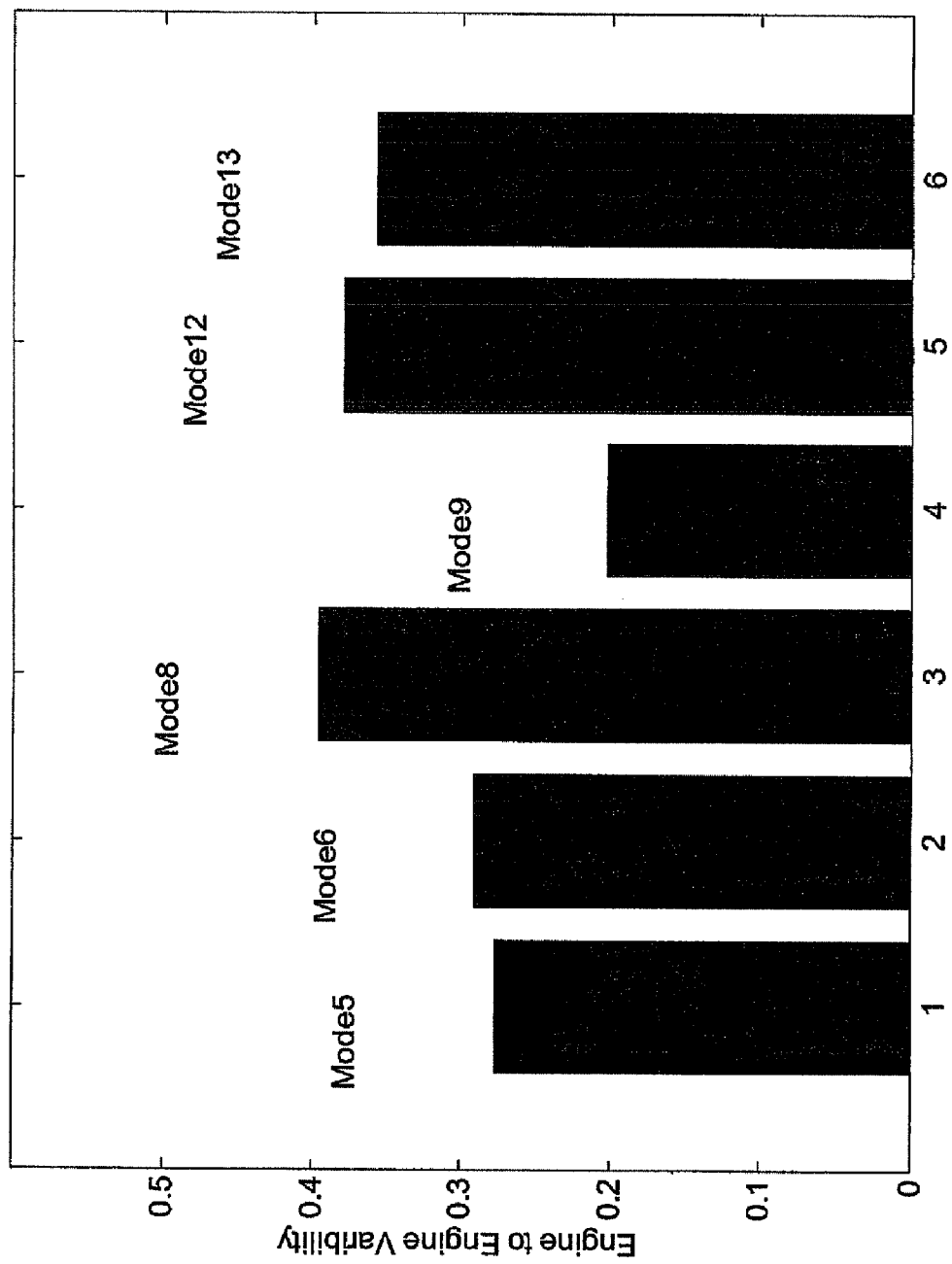
FIG. 10 is a chart that shows engine-to-engine variability at different engine modes.
Figure 11:
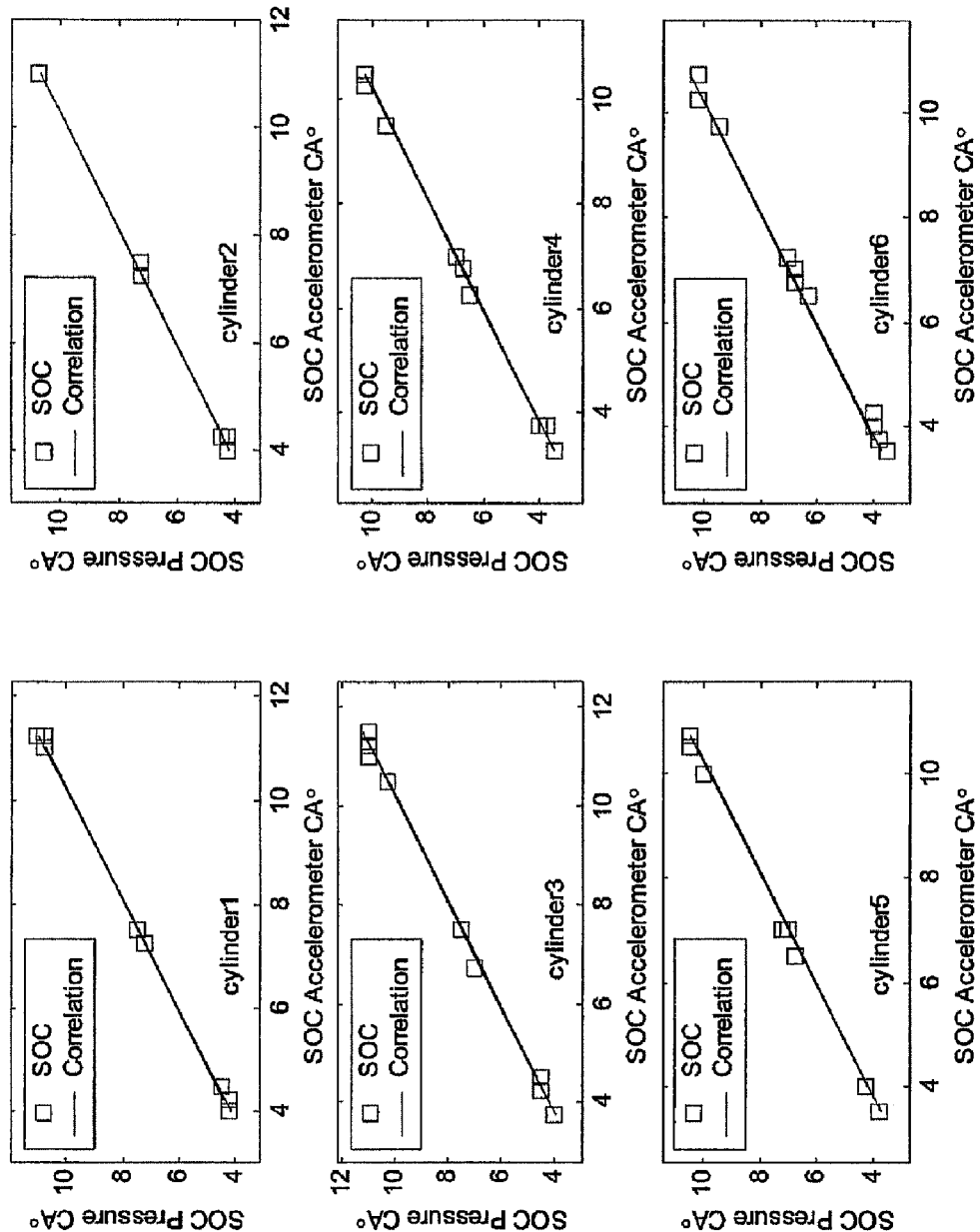
FIGS. 11 through 16 show plots that compare the global correlation with individual cylinder data for different engine operating modes.
Figure 12:
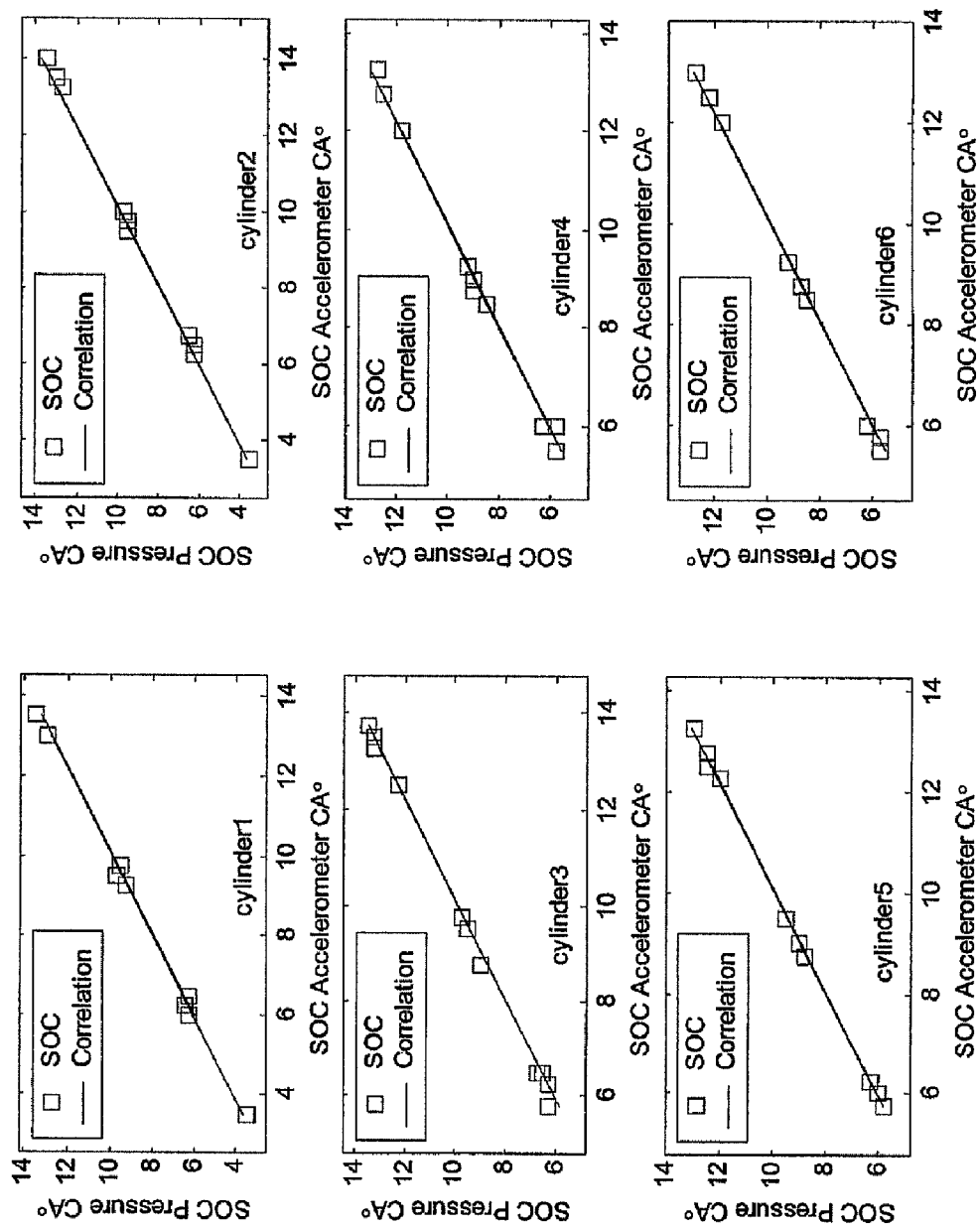
Figure 13:
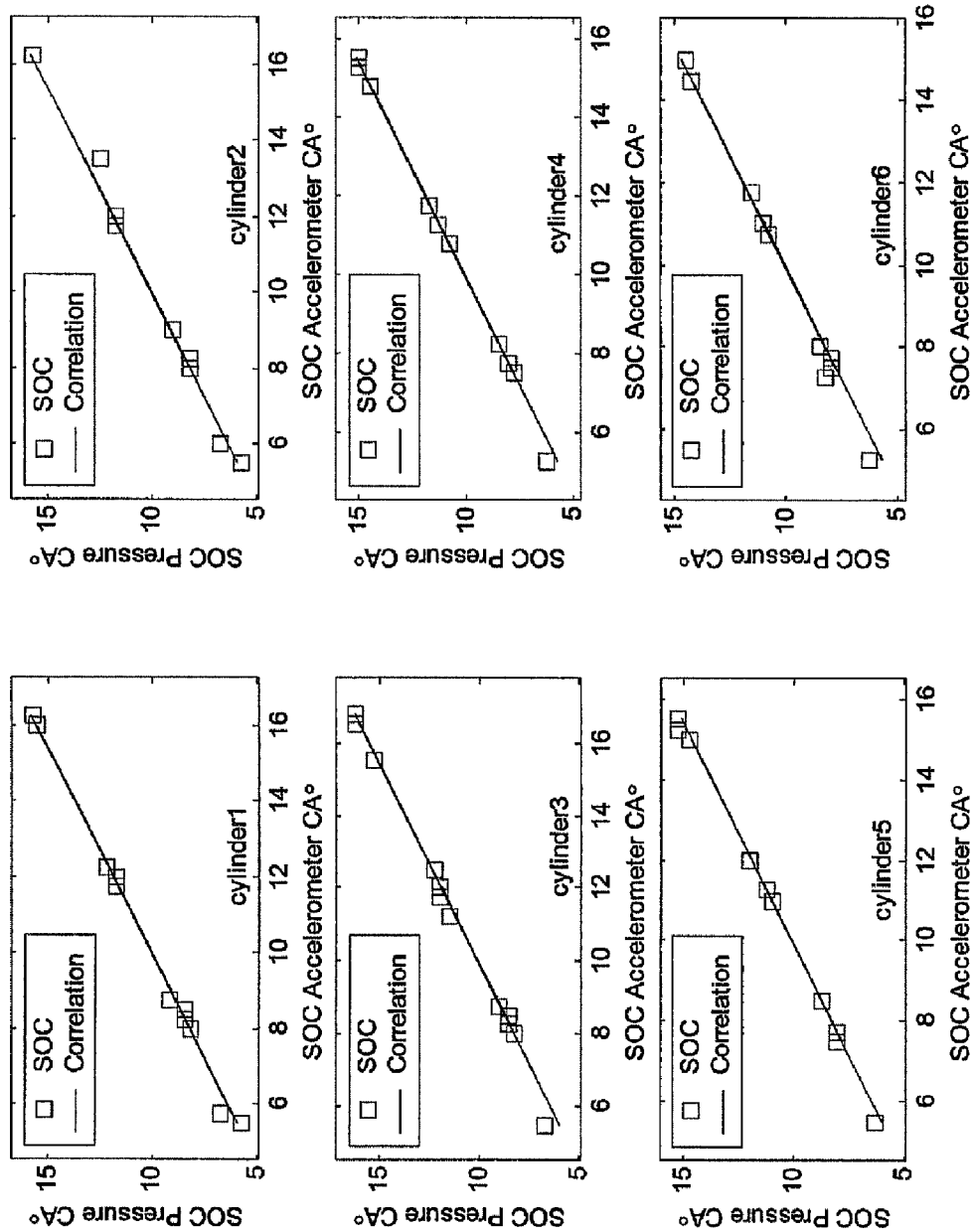
Figure 14:
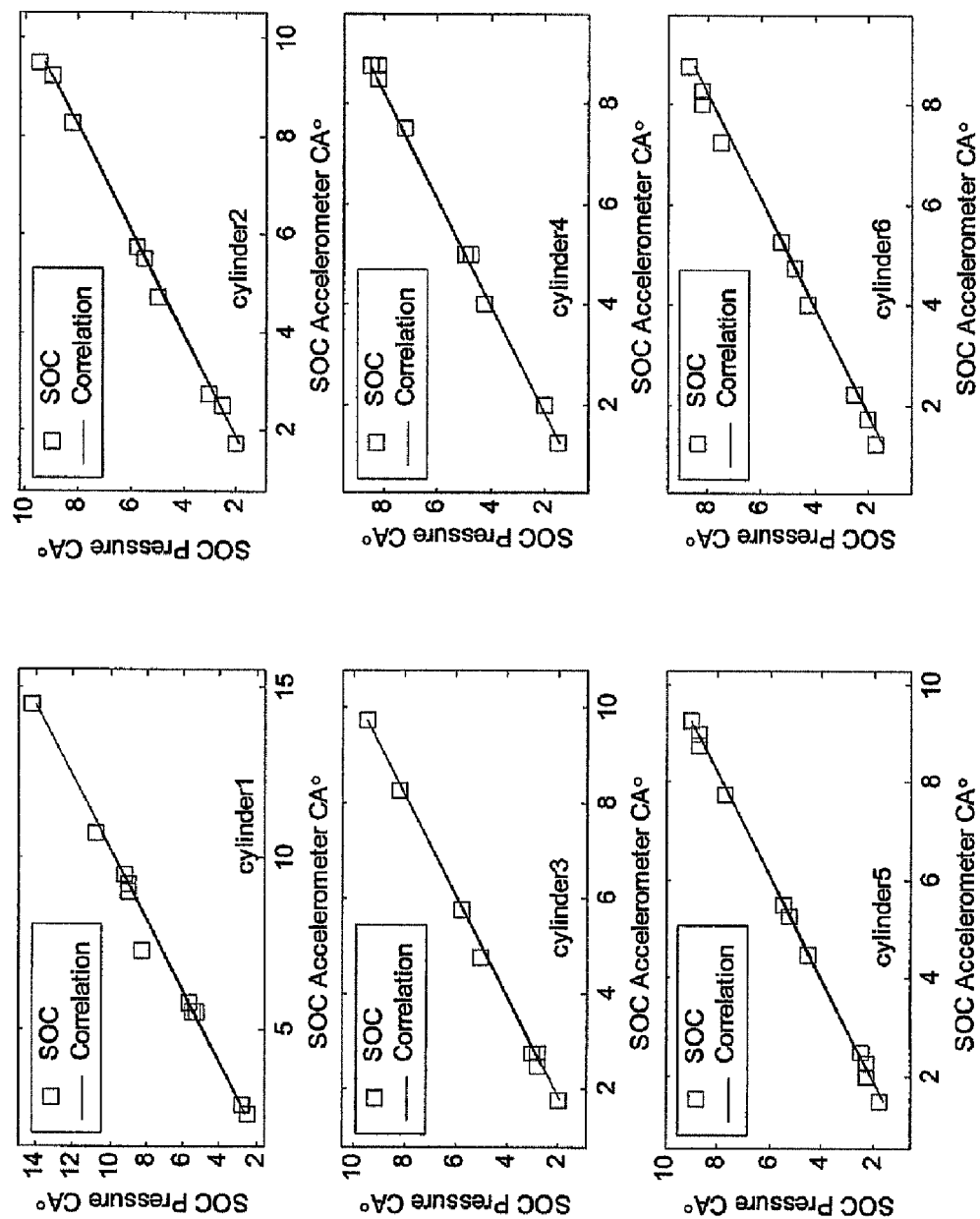
Figure 15:
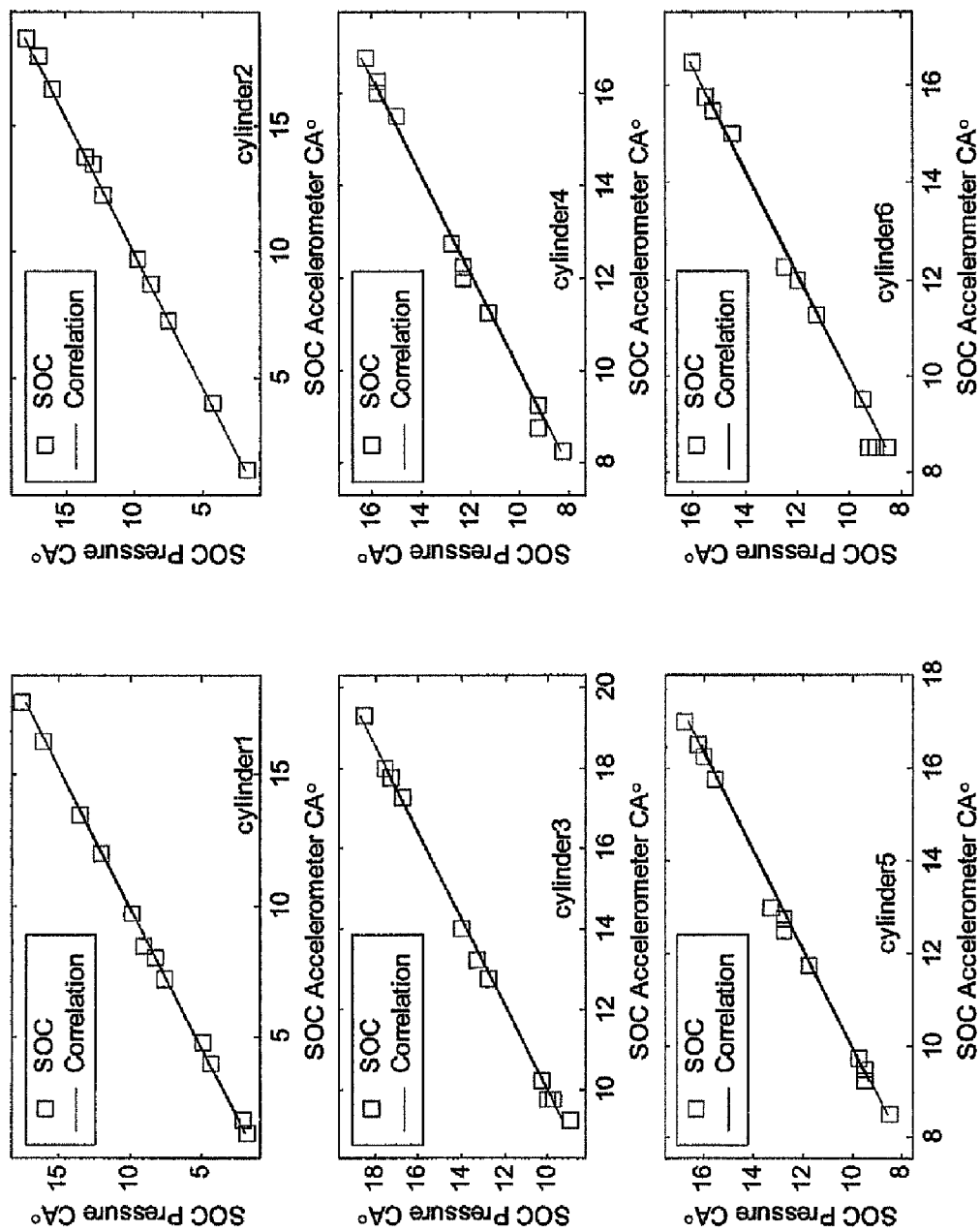
Figure 16:
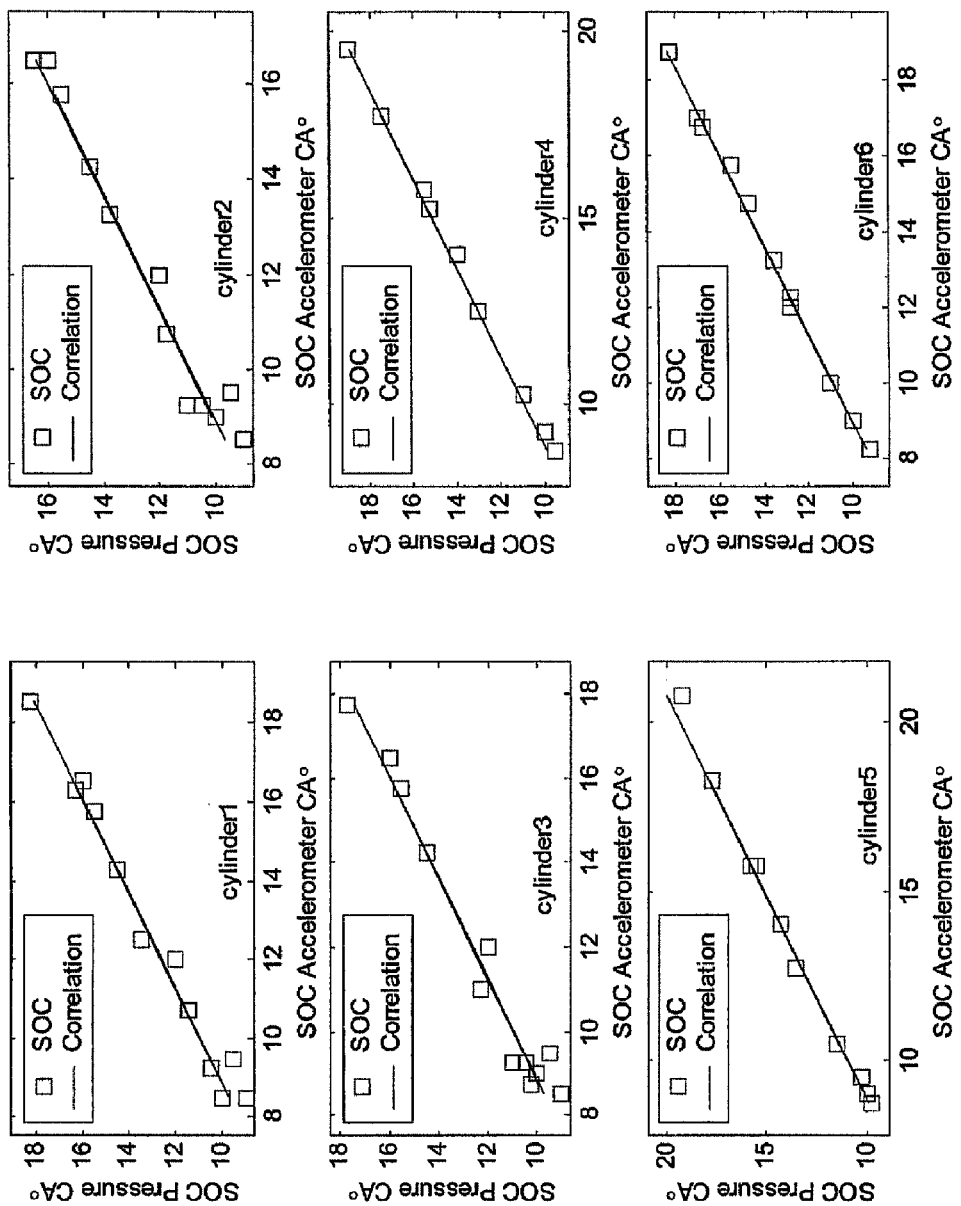

Table 2 shows the engine-to-engine variability calculated from the experimental data. For most modes, the variability is significantly less than 0.5 crank angle degrees (CA°). The results are also shown graphically in FIG. 10 which graphs engine-to-engine variability at different engine modes. The average engine-to-engine variability with 98.9% confidence level is 0.32.

TABLE 2

Total Error and Engine-to-Engine Variation

| ESC Mode | Speed (rpm) | Load (N m) | Total Error ($1\sigma$) (CA °) | Engine-to-engine Variation (CA °) with 98.9% Confidence Level ($3\sigma$) |
|---|---|---|---|---|
| 5 | 1885 | 414 | 0.16 | 0.28 |
| 6 | 1885 | 620 | 0.17 | 0.29 |
| 8 | 2291 | 213 | 0.22 | 0.40 |
| 9 | 2291 | 812 | 0.15 | 0.20 |
| 12 | 2698 | 620 | 0.21 | 0.38 |
| 13 | 2698 | 414 | 0.23 | 0.36 |
| Average | | | 0.19 | 0.32 |

Figure 17:
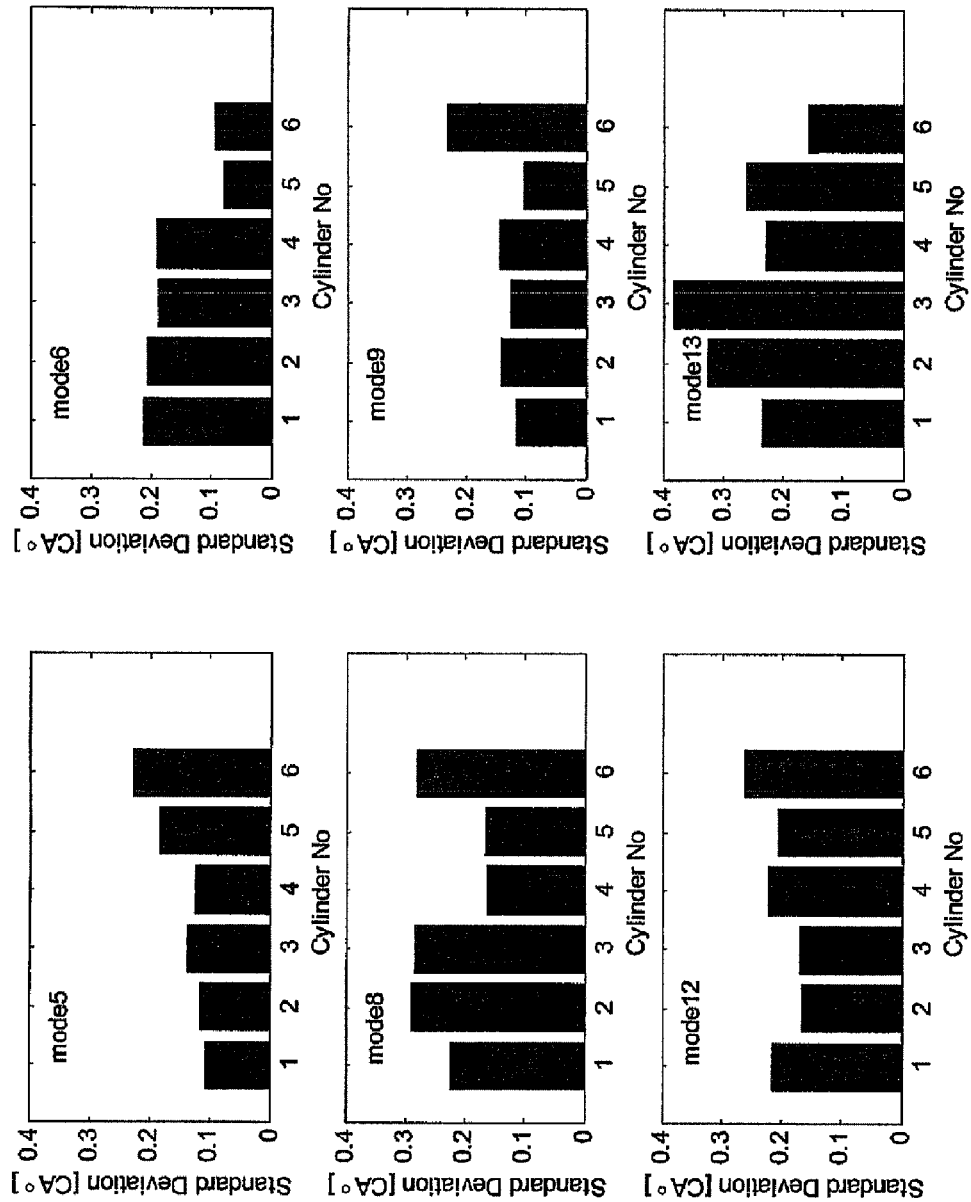
FIG. 17 show plots for different engine operating modes the error standard deviation for each cylinder.

Since the correlation between measured and actual timing for start of combustion is derived for each mode for all cylinders, it is important to examine the cylinder-to-cylinder variation to see if there is any significant deviation from the global correlation. FIGS. 11 through 16 show the correlation and measurement for each cylinder. The results are from both engines. These plots show that the global correlation fits very well with the data from the individual cylinders; which implies that cylinder to cylinder variation is very small with the disclosed method. The cylinder to cylinder variation can also be quantified using the error standard deviation shown in FIG. 17.

The experimental results described above show that the disclosed method can be employed to determine combustion characteristics from an accelerometer signal with high accuracy with high robustness. The disclosed method also has the additional advantages associated with accelerometer based techniques in comparison with the in-cylinder techniques, including low cost, non-intrusive mounting and higher reliability due to higher redundancy.

While particular elements, embodiments and applications of the present invention have been shown and described, it will be understood that the invention is not limited thereto since modifications can be made by those skilled in the art without departing from the scope of the present disclosure, particularly in light of the foregoing teachings.

What is claimed is:

1. A method of determining a combustion characteristic for an internal combustion engine from an accelerometer signal, said method comprising the steps of:
   (a) operating a calibration engine, equipped with a calibration sensor and a reference accelerometer sensor, at a predetermined operating condition and using said calibration sensor to detect said combustion characteristic and said reference accelerometer sensor to collect a reference accelerometer signal;
   (b) correlating said combustion characteristic with said reference accelerometer signal and storing correlated data in a calibration table where it is associated with said predetermined operating condition; and
   (c) equipping an engine with an accelerometer sensor, said calibration table, and an electronic engine controller, whereby when said engine is operated at said predetermined operating condition, said electronic engine controller can determine a real-time combustion characteristic by collecting a real-time accelerometer signal from said accelerometer and cross correlating with said correlated data stored in said calibration table.

2. The method of claim 1 wherein said calibration sensor is a pressure transducer that measures in-cylinder pressure.

3. The method of claim 2 wherein said combustion characteristic comprises at least one of heat release rate, peak heat release rate, and timing for start of combustion, which are derived from measured in-cylinder pressure.

4. The method of claim 1 wherein said calibration table comprises correlated data associated with a plurality of predetermined operating conditions each associated with a particular engine speed and load.

5. The method of claim 1, further comprising:
   when producing said calibration table,
      applying a fast Fourier transform to said reference accelerometer signal to yield a power spectrum for said reference accelerometer signal;
      identifying a characteristic frequency of said reference accelerometer signal when combustion occurs for said predetermined operating condition;
      applying to said reference accelerometer signal a band-pass filter with a central frequency equal to said characteristic frequency, to produce a filtered reference accelerometer signal; and
      normalizing said filtered reference accelerometer signal before storing it in said calibration table; and
   programming said electronic engine controller to apply to said real-time accelerometer signal said band-pass filter with said central frequency equal to said characteristic frequency, to produce a filtered real-time accelerometer signal.

6. The method of claim 5 further comprising programming said electronic engine controller to cross correlate said filtered real-time accelerometer signal with said filtered reference accelerometer signal stored in said calibration table and to identify a phase shift at a maximum positive correlation.

7. The method of claim 6 wherein said combustion characteristic comprises timing for start of combustion and said method further comprises programming said electronic engine controller to determine a real-time value for start of combustion timing by applying said phase shift to a value for start of combustion timing that is stored in said calibration table as part of said correlated data.

8. The method of claim 1 further comprising using a regression method to calculate a linear correlation between said reference accelerometer signal and said combustion characteristic for said predetermined operating condition.

9. The method of claim 1 further comprising programming said electronic engine controller to reject a value determined for said real-time combustion characteristic and re-sampling to collect another real-time accelerometer signal when:
   a secondary real-time indicator of said real-time combustion characteristic generates a value for said real-time combustion characteristic that is different from said value determined by said electronic engine controller using said calibration table, by more than a predetermined threshold.

10. The method of claim 9 wherein said combustion characteristic is start of combustion timing, and said secondary real-time indicator of real-time start of combustion timing is the timing when amplitude of said filtered real-time accelerometer signal surpasses said predetermined threshold value associated with said predetermined operating condition.

11. The method of claim 10 wherein said predetermined threshold value is a predetermined percentage of peak amplitude for said filtered reference accelerometer signal for said predetermined operating condition.

12. The method of claim 1 wherein said reference accelerometer signal and said real-time accelerometer signal are collected for only a predetermined portion of an engine cycle.

13. A control system for an internal combustion engine, said control system comprising:
- an accelerometer sensor mounted to said internal combustion engine at a location where said accelerometer sensor can detect oscillations that correlate to a combustion characteristic;
- a calibration table in which is stored, in association with a predetermined operating condition, a reference accelerometer signal collected from a calibration engine and an associated combustion characteristic derived from data collected by a calibration sensor when operating said calibration engine;
- an electronic engine controller programmed to receive a real-time accelerometer signal from said accelerometer and to cross correlate it with said reference accelerometer signal for said predetermined operating condition, to determine a real-time combustion characteristic from a combustion characteristic stored in said calibration table in association with said reference accelerometer signal; and
- a signal wire for transmitting said signal from said accelerometer sensor to said electronic engine controller.

14. The control system of claim 13 wherein said controller is further programmed to compare said real-time combustion characteristic to a target combustion characteristic and to command a change to at least one engine operating parameter until said real-time combustion characteristic matches said target combustion characteristic.

15. The control system of claim 13 wherein said combustion characteristic comprises at least one of heat release rate, peak heat release rate, and timing for start of combustion.

16. A calibration engine comprising:
- an engine block comprising at least one combustion chamber defined by a cylinder, a piston and a cylinder head;
- a calibration sensor associated with said engine for detecting a combustion characteristic;
- an accelerometer sensor mounted to said internal combustion engine at a location where said accelerometer sensor can detect oscillations that correlate to said combustion characteristic;
- a data storage device for storing data associated with a predetermined engine operating condition, said data comprising a reference accelerometer signal collected from said reference accelerometer sensor, and a value associated with said combustion characteristic collected from said calibration sensor; and
- wiring to respectively connect said accelerometer sensor and said calibration sensor to said data storage device.

17. The calibration engine of claim 16 wherein said calibration sensor is a pressure transducer mounted in said cylinder head with a sensor probe in said combustion chamber.

* * * * *